(12) United States Patent
Chaudhary et al.

(10) Patent No.: US 10,563,022 B2
(45) Date of Patent: Feb. 18, 2020

(54) HYDROXYL-TERMINATED PDMS AS CURE CONTROL ADDITIVE FOR THE SILANE CROSSLINKING OF POLYOLEFINS

(71) Applicant: Dow Global Technologies LLC, Midland, MI (US)

(72) Inventors: Bharat I. Chaudhary, Collegeville, PA (US); Amy L. Waxman, Collegeville, PA (US); Peter C. Dreux, Collegeville, PA (US); Kurt A. Bolz, III, Collegeville, PA (US)

(73) Assignee: Dow Global Technologies LLC, Midland, MI (US)

( * ) Notice: Subject to any disclaimer, the term of this patent is extended or adjusted under 35 U.S.C. 154(b) by 110 days.

(21) Appl. No.: 15/570,330

(22) PCT Filed: Apr. 12, 2016

(86) PCT No.: PCT/US2016/027044
§ 371 (c)(1),
(2) Date: Oct. 28, 2017

(87) PCT Pub. No.: WO2016/176034
PCT Pub. Date: Nov. 3, 2016

(65) Prior Publication Data
US 2018/0127555 A1    May 10, 2018

Related U.S. Application Data

(60) Provisional application No. 62/154,839, filed on Apr. 30, 2015.

(51) Int. Cl.
*C08J 3/20* (2006.01)
*C08J 3/24* (2006.01)

(52) U.S. Cl.
CPC ............. *C08J 3/201* (2013.01); *C08J 3/20* (2013.01); *C08J 3/24* (2013.01); *C08J 2300/10* (2013.01); *C08J 2300/108* (2013.01); *C08J 2323/26* (2013.01)

(58) Field of Classification Search
CPC ....... C08J 3/201; C08J 3/20; C08J 3/24; C08J 2300/00; C08J 2300/108; C08J 2323/26
USPC ........................................................ 524/266
See application file for complete search history.

(56) References Cited

U.S. PATENT DOCUMENTS

| | | | |
|---|---|---|---|
| 4,560,719 A * | 12/1985 | Nakamura | C08K 3/02 524/269 |
| 5,266,627 A | 11/1993 | Meverden et al. | |
| 8,586,170 B2 | 11/2013 | Esseghir et al. | |
| 2010/0159206 A1 | 6/2010 | Esseghir et al. | |
| 2010/0236811 A1 | 9/2010 | Sasse et al. | |
| 2011/0178195 A1 | 7/2011 | Cheng | |
| 2012/0178867 A1 | 7/2012 | Esseghir et al. | |
| 2012/0178868 A1 | 7/2012 | Esseghir et al. | |
| 2013/0174416 A1 | 7/2013 | Esseghir et al. | |
| 2016/0108239 A1 | 4/2016 | Cree | |

FOREIGN PATENT DOCUMENTS

| | | | |
|---|---|---|---|
| WO | 2007/053051 A1 | 5/2007 | |
| WO | WO-2014209543 A1 * | 12/2014 | C08K 5/57 |

* cited by examiner

*Primary Examiner* — Kelechi C Egwim

(57) ABSTRACT

Scorch of a silane-functionalized polyolefin is minimized during melt mixing with a flame retardant through the use of a polydimethylsiloxane (PDMS) having a (1) number average molecular weight (Mn) greater than or equal to (≥) 4,000 grams per mole (g/mol), (2) viscosity of greater than or equal to (≥) 90 centipoise (cP), and (3) hydroxyl group content of less than or equal to (≤) 0.9 weight percent (wt %) based on the weight of the PDMS.

14 Claims, No Drawings

HYDROXYL-TERMINATED PDMS AS CURE CONTROL ADDITIVE FOR THE SILANE CROSSLINKING OF POLYOLEFINS

FIELD OF THE INVENTION

This invention relates to the crosslinking of silane-functionalized polyolefins. In one aspect the invention relates to controlling the crosslinking so as to avoid scorch while in another aspect, the invention relates to the use of hydroxyl-terminated polydimethylsiloxanes (PDMS) as a scorch inhibitor.

BACKGROUND OF THE INVENTION

Silane-functionalized polyolefins are often used to make compositions and articles that can be crosslinked by exposure to moisture. In certain cases, fillers that are immiscible with the polymer are incorporated in the compositions to impart functional properties (such as flame-retardancy). Examples of immiscible flame-retardant fillers are metal hydrates, carbon black and halogenated (also known as organo-halogen) compounds. The latter include various halogenated polymers and halogenated monomers, chlorinated paraffins, etc. In order to achieve good dispersion of these immiscible fillers with silane-functionalized polyolefins, the melt mixing and fabrication steps need to be done at conditions where crosslinking (due to even parts per million (ppm) quantities of water that are inevitably present) is retarded. An effective means of assessing the efficacy of moisture-cure control additives (such as scorch-retardants or cure-accelerators) is to make melt-mixed compositions, that are subsequently molded and aged in a water bath (with the degree of crosslinking, by hot-creep measurements, assessed at various time intervals).

US 2013/0174416 discloses a process for manufacturing a multilayer article, the article comprising two crosslinked semiconductive layers separated by and bonded to an insulation layer, the semiconductive layers formed from a peroxide-crosslinkable olefin elastomer and the insulation layer comprising composition comprising a silane-grafted olefinic elastomer, the process comprises the steps of: (A) injecting the silane-grafted olefinic elastomer between the two crosslinked semiconductive layers so as to have direct contact with each semiconductive layer, and (B) crosslinking the silane-grafted olefinic elastomer in the absence of a peroxide catalyst.

US 2012/0178868 discloses a crosslinkable mixture comprising a polyolefin, an alkoxysilane, an organopolysiloxane, a free radical initiator and a liquid polymer modifier. The organopolysiloxane contains two or more hydroxyl end groups. When the crosslinkable mixture is melt-shaped, a unique crosslinked composition is formed. The liquid polymer modifier improves flexibility of the melt-shaped article without decreasing dielectric strength.

US 2012/0178867 discloses that crosslinked, melt-shaped articles are manufactured by a process that does not require the use of post-shaping external heat or moisture, the process comprising the steps of: (A) forming a crosslinkable mixture of a (1) organopolysiloxane containing one or more functional end groups; and (2) silane-grafted or silane-copolymerized polyolefin; (B) melt-shaping and partially crosslinking the mixture; and (C) cooling and continuing crosslinking the melt-shaped article. Crosslinking is promoted by the addition of a catalyst to the mixture before or during melt-shaping or to the melt-shaped article.

US 2010/0159206 discloses that tapes comprising (A) a first ribbon comprising (1)(a) a polyolefin containing at least one silane functionality, and (1)(b) a hydroxy-terminated silicone polymer, or (2) a blend of a vinyl silane, polyolefin, organic initiator, e.g., peroxide, and a hydroxy-terminated silicone polymer, and (B) a second ribbon comprising a catalyst masterbatch, the second ribbon carried on the first ribbon, allow for the delivery of a consistent mixture of resin and catalyst to an injection molding machine.

These disclosures teach the use of hydroxyl-terminated PDMS for accelerating silane crosslinking of polyolefins. Although a wide range of hydroxyl-terminated PDMS are identified by these disclosures, the working examples use hydroxyl-terminated polydimethylsiloxane DMS-15 (Mn of 2,000-3,500 g/mol, viscosity of 45-85 centistokes (0.000045-0.000085 square meters per gram ($m^2$/g)), hydroxyl group (OH) level of 0.9-1.2%), and did not contain flame retardants (although the use of the latter are disclosed generally). DMS-15 grade of hydroxyl-terminated PDMS does accelerate silane crosslinking in the absence of flame-retardant fillers.

However, these disclosures do not teach the present invention. While they disclose a wide range of hydroxyl-terminated PDMS for use in crosslinking of silane-functionalized polyolefins, they do not convey that when flame-retardant fillers are present in the compositions, hydroxyl-terminated PDMS with an Mn≥4,000 g/mol, viscosity≥90 cP and hydroxyl group content of 0.9% or less, surprisingly yield more scorch-resistant compositions and a higher degree of crosslinking after moisture cure than those with an Mn≤4,000 g/mol, viscosity≤90 cP and a hydroxyl group content of more than 0.9%. That is, when a flame-retardant filler is present in the formulation, the molecular weight (viscosity) of the hydroxyl-terminated PDMS affects melt processability and moisture-induced crosslinking.

SUMMARY OF THE INVENTION

In one embodiment the invention is a process for minimizing scorch of a silane-functionalized polyolefin (A) under melt mixing conditions, and (B) in the presence of a flame retardant, the process comprising the step of contacting the silane-functionalized polyolefin with a hydroxyl-terminated polydimethylsiloxane (PDMS) having a (1) number average molecular weight (Mn) greater than or equal to (≥) 4,000 grams per mole (g/mol), (2) viscosity of greater than or equal to (≥) 90 centipoise (cP), and (3) hydroxyl group content of less than or equal to (≤) 0.9 weight percent (wt %) based on the weight of the PDMS.

The process of this invention is particularly useful in the preparation of compositions for wire and cable applications.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, is from 100 to 1,000, then all individual values, such as 100, 101, 102, etc., and subranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of various components of the composition, the parameters of the process, and the like.

"Comprising", "including", "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

"Composition" and like terms mean a mixture or blend of two or more components.

"Polymer" and like terms means a compound prepared by polymerizing monomers, whether of the same or a different type. The generic term polymer thus embraces the term homopolymer, usually employed to refer to polymers prepared from only one type of monomer, and the term interpolymer as defined below.

"Interpolymer" means a polymer prepared by the polymerization of at least two different types of monomers. This generic term includes copolymers, usually employed to refer to polymers prepared from two different types of monomers, and polymers prepared from more than two different types of monomers, e.g., terpolymers, tetrapolymers, etc.

"Olefin polymer" and like terms mean a polymer containing, in polymerized form, a majority weight percent of an olefin, for example ethylene or propylene, etc., based on the total weight of the polymer. Nonlimiting examples of olefin-based polymers include ethylene-based polymers and propylene-based polymers.

"Silane-functionalized polyolefin" and like terms mean a polyolefin comprising a group that contains a silicon atom and that can serve as a crosslinking site, e.g., an alkoxysilane group.

"Melt mixing conditions" and like terms mean temperature, pressure, agitation and like considerations at which a silane-functionalized polyolefin is molten. These conditions are exemplified by the operating conditions of a single or twin screw extruder in which a silane-functionalized polyolefin is melt blended with an immiscible compound, e.g., a flame retardant filler.

"Ambient conditions" means temperature, pressure and humidity of the surrounding area or environment of an article. For purposes of this invention, typical ambient conditions include a temperature of 23° C., atmospheric pressure and a relative humidity of 30% or greater.

"In the presence of a flame retardant filler" and like terms mean that a composition comprising a silane-functionalized polyolefin also comprises a flame retardant filler, typically in an amount of at least 1, or 2, or 5, or 10 weight percent (wt %) based on the weight of the composition.

Silane-Functionalized Polyolefin

The moisture-curable polymeric compositions used in the practice of this invention comprise a polyolefin having hydrolyzable silane groups. As here used, a "moisture-curable" polymeric composition is a composition containing at least one component having hydrolyzable silane groups that, when in the presence of water, will undergo a hydrolysis reaction to generate Si—O—Si bonds to form a crosslinking network between polymer chains. In the instant disclosure, the polyolefin having hydrolyzable silane groups include silane-functionalized olefinic polymers such as silane-functionalized polyethylene, polypropylene, etc., and various blends of these polymers. In one or more embodiments, the silane-functionalized olefinic polymers can be selected from the group consisting of (i) an interpolymer of ethylene and a hydrolyzable silane, (ii) an interpolymer of ethylene, one or more $C_3$ or higher α-olefins and/or unsaturated esters, and a hydrolyzable silane, (iii) a homopolymer of ethylene having a hydrolyzable silane grafted to its backbone, and (iv) an interpolymer of ethylene and one or more $C_3$ or higher α-olefins and/or unsaturated esters, the interpolymer having a hydrolyzable silane grafted to its backbone. Exemplary α-olefins include propylene, 1-butene, 1-hexene, 4-methyl-1-pentene and 1-octene. Exemplary unsaturated esters are vinyl acetate or an acrylic or methacrylic ester.

Polyethylene, as here used, is a homopolymer of ethylene or an interpolymer of ethylene and a minor amount (i.e., less than 50 mole percent ("mol %")) of one or more α-olefins and/or unsaturated esters having from 3 to 20 carbon atoms, or from 4 to 12 carbon atoms, and, optionally, a diene. Polyethylenes can also be a mixture or blend of such homopolymers and interpolymers. When a mixture is used, the mixture can be either an in situ blend or a post-reactor (e.g., mechanical) blend.

The polyethylene can be homogeneous or heterogeneous. Homogeneous polyethylenes typically have a polydispersity (Mw/Mn) of about 1.5 to about 3.5, an essentially uniform comonomer distribution, and a single, relatively low melting point as measured by differential scanning calorimetry (DSC). The heterogeneous polyethylenes typically have a polydispersity greater than 3.5 and lack a uniform comonomer distribution. Mw is weight-average molecular weight, and Mn is number-average molecular weight.

Polyolefins (e.g., polyethylenes) suitable for use herein can have a density in the range of from 0.850 to 0.970 grams per cubic centimeter ($g/cm^3$), or from 0.870 to 0.930 $g/cm^3$. Polymer densities are determined according to ASTM International ("ASTM") method D792. In various embodiments, the polyolefins (e.g., polyethylenes) can have a melt index ($I_2$) in the range of from 0.01 to 2000, from 0.05 to 1000, or from 0.10 to 50 grams per 10 minutes (g/10 min). Melt indices provided herein are determined according to ASTM method D1238. Unless otherwise noted, melt indices (a.k.a., $I_2$) are determined at 190° C. and 2.16 kilograms (Kg). If polyethylene homopolymer is employed, then its $I_2$ can be from 0.1 to 10 g/10 min.

Polyethylenes used in the practice of this invention can be prepared by any known or hereafter discovered process (such as high-pressure, solution, slurry, or gas-phase) using any conventional or hereafter discovered conditions and techniques. Catalyst systems include Ziegler-Natta, Phillips, and the various single-site catalysts (e.g., metallocene, constrained geometry, etc.). The catalysts can be used with or without supports.

Useful polyethylenes include low density homopolymers of ethylene made by high-pressure processes (HP-LDPE), linear-low-density polyethylenes (LLDPE), very-low-density polyethylenes (VLDPE), ultra-low-density polyethylenes (ULDPE), medium-density polyethylenes (MDPE), high-density polyethylene (HDPE), and metallocene and constrained-geometry copolymers.

High-pressure processes are typically free-radical-initiated polymerizations and conducted in a tubular reactor or a stirred autoclave. In a tubular reactor, the pressure can be in the range of from 25,000 to 45,000 pounds per square inch (psi), and the temperature can be in the range of from 200 to 350° C. In a stirred autoclave, the pressure can be in the range of from 10,000 to 30,000 psi, and the temperature can be in the range of from 175 to 250° C.

Interpolymers comprised of ethylene and unsaturated esters are well known and can be prepared by conventional high-pressure techniques. In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. The portion of the interpolymer attributed to the ester comonomer can be in the range of from 5 to less than 50 weight percent (wt %) based on the weight of the interpolymer, or in the range of 15 to 40 wt %.

Examples of acrylates and methacrylates include, but are not limited to, ethyl acrylate, methyl acrylate, methyl methacrylate, t-butyl acrylate, n-butyl acrylate, n-butyl methacrylate, and 2-ethylhexyl acrylate. Examples of vinyl carboxylates include, but are not limited to, vinyl acetate, vinyl propionate, and vinyl butanoate. The melt index of ethylene/unsaturated ester interpolymers can be in the range of from 0.5 to 50 g/10 min, or in the range of from 2 to 25 g/10 min.

VLDPE and ULDPE are typically copolymers of ethylene and one or more α-olefins having 3 to 12 carbon atoms, or 3 to 8 carbon atoms. The density of the VLDPE or ULDPE can be in the range of from 0.870 to 0.915 g/cm³. The melt index of the VLDPE or ULDPE can be in the range of from 0.1 to 20 g/10 min, or from 0.3 to 5 g/10 min. The portion of the VLDPE or ULDPE attributed to the comonomer(s), other than ethylene, can be in the range of from 1 to 49 wt % based on the weight of the copolymer, or from 15 to 40 wt %.

A third comonomer can be included, e.g., another α-olefin or a diene such as ethylidene norbornene, butadiene, 1,4-hexadiene or a dicyclopentadiene. Ethylene/propylene copolymers are generally referred to as EPR, and ethylene/propylene/diene terpolymers are generally referred to as EPDM. The third comonomer can be present in an amount of from 1 to 15 wt % based on the weight of the interpolymer, or from 1 to 10 wt %. In various embodiments, the interpolymer can contain two or three monomer types, inclusive of ethylene.

The LLDPE can include VLDPE, ULDPE, and MDPE, which are also linear, but, generally, have a density in the range of from 0.916 to 0.925 g/cm³. The LLDPE can be a copolymer of ethylene and one or more α-olefins having from 3 to 12 carbon atoms, or from 3 to 8 carbon atoms. The melt index can be in the range of from 1 to 20 g/10 min., or from 3 to 8 g/10 min.

Any polypropylene may be used in these compositions. Examples include homopolymers of propylene, copolymers of propylene and other olefins, and terpolymers of propylene, ethylene, and dienes (e.g. norbornadiene and decadiene). Additionally, the polypropylenes may be dispersed or blended with other polymers, such as EPR or EPDM. Suitable polypropylenes include thermoplastic elastomers (TPE), thermoplastic olefins (TPO) and thermoplastic vulcanates (TPV). Examples of polypropylenes are described in *Polypropylene Handbook: Polymerization, Characterization, Properties, Processing, Applications*, 3-14, 113-176 (E. Moore, Jr. ed., 1996).

Hydrolyzable silane monomers suitable for use in forming the silane-functionalized polyolefin can be any hydrolyzable silane monomer that will effectively copolymerize with an olefin (e.g., ethylene), or graft to and crosslink an olefin (e.g., ethylene) polymer. Those described by the following formula are exemplary:

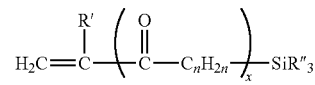

in which R' is a hydrogen atom or methyl group; x is 0 or 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), an aryloxy group (e.g. phenoxy), an araloxy group (e.g. benzyloxy), an aliphatic acyloxy group having from 1 to 12 carbon atoms (e.g. formyloxy, acetyloxy, propanoyloxy), an amino or substituted amino group (alkylamino, arylamino), or a lower-alkyl group having 1 to 6 carbon atoms inclusive, with the proviso that not more than one of the three R" groups is an alkyl. Such silanes may be copolymerized with ethylene in a reactor, such as a high-pressure process. Such silanes may also be grafted to a suitable ethylene polymer by the use of a suitable quantity of organic peroxide. Suitable silanes include unsaturated silanes that comprise an ethylenically unsaturated hydrocarbyl group, such as a vinyl, allyl, isopropenyl, butenyl, cyclohexenyl or gamma (meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266, 627 to Meverden, et al. Suitable hydrolyzable silane monomers include, but are not limited to, vinyltrimethoxysilane (VTMS), vinyltriethoxysilane (VTES), vinyltriacetoxysilane, and gamma-(meth)acryloxy propyl trimethoxy silane.

Incorporation of the hydrolyzable silane group in the polyolefin to make a silane-functionalized polyolefin can be accomplished using any known or hereafter discovered copolymerization or grafting techniques. By way of example, the hydrolyzable silane monomer can be grafted onto a polyolefin by combining a polyolefin with an unsaturated alkoxysilane (e.g., vinyltrimethoxysilane) and a peroxide (e.g., dicumyl peroxide (DCP)). Any conventional method can be used to graft the hydrolyzable silane monomer to the polyolefin, including melt blending in a twin-screw extruder or a Buss kneader at appropriate temperatures depending on the polymer and the peroxide (initiator) used. After mixing for a period of time (e.g., 1-30 minutes), the mixture can be extruded at elevated and increasing temperatures (e.g., from 160° C. to 220° C.). Whether copolymerizing or grafting, the amount of unsaturated hydrolyzable silane monomer employed in the reaction can range from 0.5 to 10 wt %, from 1 to 5 wt %, or from 1 to 3 wt % based on the combined weight of the polyolefin and the unsaturated hydrolyzable silane monomer. The incorporation of hydrolyzable silane monomer in the polyolefin can be accomplished either (1) before the silane-functionalized polyolefin is used in a formulation, or (2) after the polyolefin is included in a formulation, e.g., an embodiment in which the composition comprises a blend of a vinyl silane, polyolefin, organic initiator and a hydroxy-terminated silicone polymer. In an embodiment, the hydrolyzable silane group can be melt-blended with the polyolefin, peroxide and other ingredients in one step as part of the cable extrusion process, without a need to first prepare a compound or grafted polyolefin prior to use during cable extrusion.

An example of a commercially available polyolefin having hydrolyzable silane groups is SI-LINK™ DFDA-A5451, which is ethylene copolymerized with 1.5 wt % vinyltrimethoxysilane prepared using a high-pressure reactor, and is available from The Dow Chemical Company.

The polyolefin can also comprise blends of silane-functionalized olefinic polymer with one or more other polyolefins that are not silane functionalized.

In various embodiments, the polyolefin having hydrolyzable silane groups can be present in the crosslinkable polymeric composition in an amount of at least 30 wt %, at least 50 wt %, at least 70 wt % based on the weight of the composition. In some embodiments, the polyolefin having hydrolyzable silane groups can be present in an amount ranging from 35 to 95 wt %, from 35 to 90 wt %, or from 35 to 75 wt % based on the weight of the composition.

Hydroxyl-Terminated Polydimethylsiloxanes (PDMS)

The hydroxyl-terminated polydimethylsiloxanes (PDMS) used in the practice of this invention comprise units of the formula R$_2$SiO in which each radical R is methyl. In preferred embodiments, the polydimethylsiloxane is of the formula

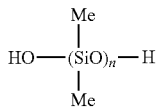

in which Me is methyl and n is a number sufficient to impart a number average molecular weight (Mn) to the PDMS of greater than or equal to (≥) 4,000. The upper value of n is typically no greater than 100,000, or 10,000, or 1,000, or 500. Such polydimethylsiloxanes are commercially available, for example as hydroxyl-terminated polydimethylsiloxane from Gelest, Inc.

In one embodiment the PDMS used in the practice of this invention has a number average molecular weight (Mn) greater than or equal to (≥) 4,000, or 15,000, or 35,000, or 70,000 and typically has an Mn less than or equal to (≤) 500,000, or 400,000, or 300,000, or 200,000.

In one embodiment the PDMS used in the practice of this invention has a viscosity in centipoise (cP) greater than or equal to (≥) 90, or 500, or 700, or 1,500 and typically has a viscosity in cP less than or equal to (≤) 500,000, or 400,000, or 300,000, or 200,000.

In one embodiment the PDMS used in the practice of this invention has a hydroxyl group content in weight percent (wt %) based on the weight of the PDMS of less than or equal to (≤) 0.9, or 0.6, or 0.3, or 0.1, and greater than zero, or greater than or equal to (≥) 0.01, or 0.02, or 0.03, or 0.04.

Mn is measured by gel permeation chromatography (GPC), viscosity is measured using a BROOKFIELD viscometer (Model LVF, Spindle No. 4 at 12 revolutions per minute (rpm))), as described in U.S. Pat. No. 5,130,041. Hydroxyl group content is measured by $^1$H NMR spectroscopy or other analytical techniques, similar to the approaches used in *Malaysian Polymer Journal*, Vol. 4, No. 2, p 52-61, 2009 and *European Polymer Journal*, Vol. 49, 228-234 (2013).

Nonlimiting examples of suitable hydroxyl-terminated polydimethylsiloxane include, but are not limited to, DMS-S45 (number average molecular weight (Mn) of 110,000 grams per mole (g/mol), viscosity of 50,000 cP, —OH level of 0.03%), DMS-S27 (Mn of 18,000 g/mol, viscosity of 700-800 cP, —OH level of 0.2%), both from Gelest, Inc., and XIAMETER™ OHX-4000 (viscosity 2,000 cP, silanol content as reported in WO 2007/053051 of 0.15%) from Dow Corning. In some embodiments the polyfunctional organopolysiloxane comprises branches such as those imparted by Me-SiO$_{3/2}$ or SiO$_{4/2}$ groups (known as T or Q groups to those skilled in silicone chemistry).

The amount of PDMS used in the practice of this disclosure can vary widely depending upon the nature of the polymer, the alkoxysilane, the PDMS, the processing or reactor conditions, the ultimate application, and similar factors, but typically at least 0.5, preferably at least 1, weight percent is used based on the combined weight of the silane-functionalized polyolefin, flame retardant and PDMS. Considerations of convenience, polymer acceptance and economy are some of the principal limitations on the maximum amount of PDMS used in the practice of this disclosure, and typically the maximum amount of PDMS does not exceed 15, preferably it does not exceed 7, weight percent based on the combined weight of the silane-functionalized polyolefin, flame retardant and PDMS.

Flame Retardant

The present composition includes a flame retardant (FR) that is either solid or liquid at 22° C. Any of a wide range of FR can be used in the practice of the embodiments of this invention in which an FR is present, and these include, but are not limited to, metal hydrates, carbon black, halogenated compounds (including, but not limited to, brominated flame retardants), inorganic synergists (such as antimony trioxide), nitrogen and/or phosphorus-based halogen-free compound, epoxidized novolac resin, and mixtures of two or more of such FR. Representative inorganic FR include aluminum trihydroxide, magnesium hydroxide, various phosphorus compounds, ammonium bromide, antimony trioxide, zinc oxide, zinc borate, barium sulfate, silicones, aluminum silicate, calcium silicate, intumescent compounds, carbon black, expandable graphite, and mixtures thereof. The FR may contain various surface coatings or treatments, such as silanes, fatty acids, and the like.

In one embodiment the flame retardant comprises one or more halogenated organic compound such as, but not limited to, halogenated hydrocarbons such as chlorinated paraffin, halogenated aromatic compounds such as pentabromotoluene, decabromodiphenyl oxide, decabromodiphenyl ethane, ethylene-bis(tetrabromophthalimide), dechlorane plus, and other halogen-containing flame retardants. One skilled in the art recognizes and selects the appropriate halogen agent depending on the desired performance of the composition.

In one embodiment the flame retardant comprises at least one compound selected from resorcinol bis(diphenyl phosphate) (RDP), bis(diphenyl phosphate) (BDP), bisphenol-A bis(diphenyl phosphate) (BPADP), aluminum trihydrate or trihydroxide (ATH), a nitrogen/phosphorus-based halogen-free flame retardant, and epoxidized novolac resin. BPADP and RDP are commercially available from Adeka Palmarole and Supresta, respectively. A nonlimiting example of a suitable nitrogen/phosphorus-based halogen-free flame retardant is FP-2100J (piperazine pyrophosphate) available from Adeka Palmarole under the designation ADK STAB FP-2100J. An "epoxidized novolac resin," as used herein, is the reaction product of epichlorohydrin and phenol novolac polymer in an organic solvent. In an embodiment, the epoxidized novolac resin has the structure (II) below:

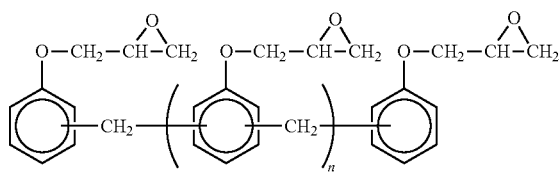

wherein n is an integer from 1 to about 1000.

In an embodiment, the composition contains epoxidized novolac resin in a lower limit of 0.01 wt %, or 0.1 wt %, or 0.5 wt % and an upper amount of epoxidized novolac resin of 20 wt %, or 10 wt %, or 8 wt %. Epoxidized novolac resin is available from The Dow Chemical Company.

In an embodiment, the total flame retardant present in the composition is from 1 wt % to 80 wt %, or from 10 wt % to 70 wt %, based on the total weight of the composition. The term "total flame retardant" is the weight percent sum of all the flame retardant(s) present in the composition.

In an embodiment, the flame retardant is an intumescent flame retardant.

Fillers and Additives

The compositions of this invention, i.e., those containing a silane functionalized olefin polymer and a hydroxyl-terminated PDMS, may also include one or more fillers and/or additives in addition to the above-described flame retardants. If a filler is present, then it should not be present in an amount that would cause unacceptably large degradation of the electrical and/or mechanical properties of the silane-crosslinked olefin polymer. Typically, the amount of filler present is between 2 and 80, preferably between 5 and 70, weight percent (wt %) based on the weight of the polymer. Representative fillers include talc, calcium carbonate, glass fibers, marble dust, cement dust, feldspar, silica or glass, fumed silica, silicates, alumina, titanium oxides, glass microspheres, chalk, mica, clays, wollastonite, ammonium octamolybdate, kaolin clay, magnesium hydroxide, and carbon blacks. The filler may or may not have flame retardant properties. In a preferred embodiment of this invention in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this invention can contain other additives such as, for example, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), colorants or pigments to the extent that they do not interfere with desired physical or mechanical properties of the compositions of the present invention, and other flame retardant additives. The above additives are employed in functionally equivalent amounts known to those skilled in the art, generally in amounts of up to about 65 percent by weight, based upon the total weight of the composition.

Compounding and Curing

The compositions used in the practice of this invention can be made by simply dry blending or melt blending the individual components and additives. For convenience, certain of the ingredients may be premixed, such as by melt processing, into master batches. Such master batches are useful in aiding uniform dispersion of the ingredients and minimizing the number of components that need to be blended at an end-user's facilities.

The silane-functionalized polymers used in the practice of this invention may be cured by contact with, or exposure to, water (moisture), preferably in the presence of a condensation catalyst (also known as a "moisture-cure" catalyst). Suitable catalysts include metal carboxylates, such as dibutyltin dilaurate, stannous octoate, stannous acetate, lead naphthenate and zinc octoate; organic metal compounds, such as titanium esters and chelates such as tetrabutyl titanate; organic bases, such as ethylamine, hexylamine and piperidine; and acids, such as mineral acids and fatty acids. Ambient or accelerated cure systems typically use fast acting condensation catalysts, such as aromatic sulphonic acids. Preferred catalysts are organic tin compounds such as dibutyltin dilaurate, dibutyl dimethoxy tin, dibutyltin bis(2,4-pentanedionate), stannous octoate, and aromatic sulphonic acids. Such moisture-cure condensation catalysts and catalyst systems are readily commercially available. Examples of suitable commercial catalysts in masterbatch form include, without limitation, DFDB 5480NT (a tin catalyst system), DFDA 5488NT (a fast ambient cure catalyst masterbatch) from The Dow Chemical Company, or the Borealis AMBICAT™ system LE 4476.

The minimum amount of crosslinking catalyst used in the practice of this disclosure is a catalytic amount. Typically this amount is at least 0.01, preferably at least 0.02 and more preferably at least 0.03, weight percent (wt %) of the combined weight of the silane-functionalized polyolefin and the catalyst. The only limit on the maximum amount of crosslinking catalyst used to crosslink the polymer is that imposed by economics and practicality (e.g., diminishing returns), but typically a general maximum comprises less than 5, preferably less than 3 and more preferably less than 2, wt % of the combined weight of polymer and catalyst.

The moisture cure may be done in a steam chamber, a continuous steam vulcanization tunnel, a hot water sauna, or simply by exposure to air (ambient cure) or any other convenient means.

The compositions of the present invention can be processed to fabricated articles by any suitable means known in the art. For example, the compositions can be processed to films or sheets or to one or more layers of a multilayered structure by know processes, such as calendering, blowing, casting or (co-)extrusion processes. Injection molded, compression molded, extruded or blow molded parts can also be prepared from the compositions of the present invention. Alternatively, the compositions can be processed to foams or fibers or extruded into wire and cable coatings such as jacketing and insulation.

EXAMPLES

Test Methods

Viscosity at 25° C. is measured with a BROOKFIELD viscometer (Model LVF, Spindle No. 4 at 12 rpm), as described in U.S. Pat. No. 5,130,041.

Hydroxyl Content is determined by $^1$H NMR spectroscopy or other analytical techniques, similar to the approaches used in *Malaysian Polymer Journal*, Vol. 4, No. 2, p 52-61, 2009 and *European Polymer Journal*, Vol. 49, 228-234 (2013).

Mn is measured by gel permeation chromatography (GPC).

Moving Die Rheometer (MDR) analyses are performed on the compositions using Alpha Technologies Rheometer MDR model 2000 unit. Testing is based on ASTM procedure D 5289, "Standard Test Method for Rubber—Property Vulcanization Using Rotorless Cure Meters". The MDR analyses are performed using 6 grams of material. Samples are tested at 182° C. with 0.5 degrees arc oscillation. Materials directly from the BRABENDER™ mixing bowl are tested for resistance to premature crosslinking at extrusion conditions ("scorch"), as assessed by ts0.1 (time for 0.1 pound (lb)-in increase in torque over the starting/initial values), and for starting/initial values of torque of the "unaged compositions". Molded specimens of 75 mil thickness are cured in a 90° C. water bath for 24 hours and subsequently tested in the MDR; the starting/initial value of torque is used as a measure of "ultimate moisture crosslinking after 24 hours in 90° C. water bath". Molded specimens of 75 mil thickness are also aged for 8 weeks at 23° C. and 50% relative humidity (RH) and subsequently tested in the MDR; the starting/initial value of torque is used as a measure of "shelf stability after 8 weeks at 23° C. and 50% RH", as is the increase in starting/initial torque over that of the unaged composition in that time period.

Materials

SI-LINK™ DFDA-5451 is a crosslinkable ethylene-silane copolymer available from The Dow Chemical Company.

SAYTEX™ 8010 is ethane-1,2-bis(pentabromophenyl) available from Albemarle.

MICROFINE™ AO9 is standard grade antimony trioxide available from Great Lakes (Chemtura Group).

Mistron ZSC is an off-white, high purity, platy, very fine talc available from Luzenac America.

IRGANOX™ 1010 FF is butyl-4-hydrocinnamate))methane available from BASF.

DFDA-5481 NT is a silanol condensation catalyst masterbatch developed to be used in conjunction with moisture curable ethylene-silane copolymers, such as SI-LINK™ polyethylene DFDA-5451. It is available from The Dow Chemical Company.

Dow Corning 200 PDMS, 60,000 CST (not hydroxyl terminated): 60,000 cP viscosity and an Mn of 82,070.

DMS-S15 is a hydroxyl-terminated PDMS with a hydroxyl content of 0.9-1.2%, a 45-85 cP viscosity, and an Mn of 2,000-3,500 g/mol available from Gelest, Inc.

XIAMETER™ OHX-4000 is a hydroxyl-terminated PDMS with a silanol content of 0.15% and a viscosity of 2,000 cP.

DMS-S45 is a hydroxyl-terminated PDMS with a hydroxyl content of 0.03%, a 50,000 cP viscosity, and an Mn of 110,000 g/mol available from Gelest, Inc.

DMS-S27 is a hydroxyl-terminated PDMS with a hydroxyl content of 0.2%, a 700-800 cP viscosity, and an Mn of 18,000 g/mol available from Gelest, Inc.

Protocol

Approximately 400 grams of each composition are made as follows. A BRABENDER™ Prep-Mixer with 3-Piece Design, 350 milliliter (mL) capacity and cam rotors is charged with half of the required amount SI-LINK™ DFDA-5451 ethylene-silane copolymer and fluxed at 25 revolutions per minute (rpm) and 125° C. set temperature for 2-3 minutes. Next, the following solid ingredients are added slowly in the sequence shown at 25 rpm and 125° C. set temperature, allowing an additional 1-2 minutes for each to be incorporated before the next ingredient is charged: SAYTEX™ 8010 (brominated flame retardant filler), MICROFINE™ AO9 (antimony trioxide flame retardant synergist filler) and Mistron ZSC (talc filler). If hydroxyl-terminated PDMS is used, it is added simultaneously with the charging of the Mistron ZSC (talc filler) and the mixer is operated at 25 rpm and 125° C. set temperature for 1-2 minutes as well. The remainder of the SI-LINK™ DFDA-5451 ethylene-silane copolymer is then added, along with the IRGANOX™ 1010 FF (antioxidant), and the blend is mixed at 40 rpm and 125° C. set temperature for an additional 5 minutes. The silanol condensation catalyst masterbatch (DFDA-5481 NT) is charged to the mixer last and the overall composition is operated for an additional 3 minutes at 40 rpm and 125° C. set temperature.

After mixing, the composition is removed from the mixer and cold pressed into thin sheets and compression molded immediately (thickness of 75 mil). Molding conditions are 150° C. for 6 minutes (500 pounds per square inch (psi) for 6 minutes followed by 2500 psi for 3 minutes, cooled 30° C. at 2500 psi, and then removed).

The molded sheets are cured at 23° C. and 50% relative humidity water for varying lengths of time.

The compositions and test results are reported in the Table below.

TABLE

Scorch-Resistance at Extrusion Conditions (182° C.)
Ultimate Crosslinking after Moisture Cure (90° C. Water Bath)
Shelf Stability at 23° C. and 50% Relative Humidity

| Components | Weight Percent (Wt %) | | | | | |
| --- | --- | --- | --- | --- | --- | --- |
|  | CE1 | CE2 | CE3 | Ex. 1 | Ex. 2 | Ex. 3 |
| DFDA-5451 (ethylene-silane copolymer) | 56.77 | 55.52 | 55.52 | 55.52 | 55.52 | 55.52 |
| SAYTEX ™ 8010 (flame retardant) | 27.29 | 27.29 | 27.29 | 27.29 | 27.29 | 27.29 |
| MICROFINE ™ AO9 (antimony trioxide) | 6.82 | 6.82 | 6.82 | 6.82 | 6.82 | 6.82 |
| Mistron ZSC (talc) | 6.02 | 6.02 | 6.02 | 6.02 | 6.02 | 6.02 |
| IRGANOX ™ 1010 FF (antioxidant) | 0.1 | 0.1 | 0.1 | 0.1 | 0.1 | 0.1 |
| DFDA-5481 NT (masterbatch of silanol condensation catalyst) | 3 | 3 | 3 | 3 | 3 | 3 |
| DOW CORNING 200, 60,000 CST (not hydroxyl terminated PDMS) |  | 1.25 |  |  |  |  |
| DMS-S15 (hydroxyl-terminated PDMS, hydroxyl content: 0.9-1.2%, viscosity: 45-85 cP, and Mn: 2,000-3,500 g/mol) |  |  | 1.25 |  |  |  |
| XIAMETER ™ OHX-4000 (hydroxyl-terminated PDMS, silanol content: 0.15%, viscosity: 2,000 cP) |  |  |  | 1.25 |  |  |
| DMS-S45 (hydroxyl-terminated PDMS, hydroxyl content: 0.03%, viscosity: 50,000 cP, and Mn: 110,000 g/mol) |  |  |  |  | 1.25 |  |
| DMS-S27 (hydroxyl-terminated PDMS, hydroxyl content: 0.2%, viscosity: 700-800 cP, and Mn: 18,000 g/mol) |  |  |  |  |  | 1.25 |
| Moving Die Rheometer Measurements at 182° C. |  |  |  |  |  |  |
| Scorch Resistance at Extrusion Conditions After Melt Mixing: MDR ts0.1 (min) | 1.5 | 2.0 | 2.0 | 3.7 | 3.2 | N.A. |
| Ultimate Moisture Crosslinking after 24 hours in 90° C. Water Bath: MDR Torque (lb. in.) | 2.1 | 2.1 | 2.2 | 2.6 | 2.6 | N.A. |
| Shelf Stability after 8 Weeks at 23° C. and 50% Relative Humidity: MDR Torque (lb. in.) | 2.0 | 1.8 | N.A. | 1.4 | N.A. | 1.4 |
| Shelf Stability after 8 Weeks at 23° C. and 50% Relative Humidity: Increase in MDR Torque over that of Unaged Composition (lb in.) | 1.0 | 1.1 | N.A. | 0.5 | N.A. | N.A. |

Inventive Examples (Ex. 1 and Ex. 2) report improved scorch resistance (i.e., lower crosslinking) as evidenced by the higher ts0.1 (min) values at extrusion conditions (182° C.) (3.7 and 3.2, respectively, as opposed to 1.5, 2.0 and 2.0 for Comparative Examples (CE1, CE2 and CE3), respectively. Surprisingly, however, Ex. 1 and Ex. 2 report a higher ultimate cure (2.6 lb in. vs. 2.1 and 2.2 lb in.). Moreover, the samples of Ex. 1 and Ex. 2 also exhibit better shelf stability with lower torque after aging, and lower increase in torque compared to unaged samples.

What is claimed is:

1. A process for minimizing scorch of a silane-functionalized polyolefin (A) under melt mixing conditions, and (B) in the presence of a flame retardant, the process comprising the steps of:
    (i) contacting the silane-functionalized polyolefin with the flame retardant; and
    (ii) after step (i), adding a hydroxyl-terminated polydimethylsiloxane (PDMS) to the silane-functionalized polyolefin and the flame retardant, the PDMS having a
        (1) number average molecular weight (Mn) greater than or equal to ($\geq$) 4,000 grams per mole (g/mol),
        (2) viscosity of greater than or equal to ($\geq$) 90 centipoise (cP), and
        (3) hydroxyl group content of less than or equal to ($\leq$) 0.9 weight percent (wt %) based on the weight of the PDMS.

2. In a process for minimizing scorch of a silane-functionalized polyolefin (A) under melt mixing conditions, (B) in the presence of a flame retardant, and (C) in the presence of a hydroxyl-terminated polydimethylsiloxane (PDMS), the improvement comprising the steps of:
    (i) contacting the silane-functionalized polyolefin with the flame retardant; and
    (ii) after step (i), adding the PDMS to the silane-functionalized polyolefin and the flame retardant, the PDMS having a (1) number average molecular weight (Mn) greater than or equal to ($\geq$) 4,000 grams per mole (g/mol), (2) viscosity of greater than or equal to ($\geq$) 90 centipoise (cP), and (3) hydroxyl group content of less than or equal to ($\leq$) 0.9 weight percent (wt %) based on the weight of the PDMS.

3. The process of claim 1 in which the silane-functionalized polyolefin is a silane-functionalized polyethylene or polypropylene.

4. The process of claim 3 in which the polyethylene or polypropylene is functionalized with an alkoxysilane group.

5. The process of claim 1 in which the flame retardant is at least one of a metal hydrate, carbon black, halogenated compounds, nitrogen and/or phosphorus-based halogen-free compound, and an epoxidized novolac resin.

6. The process of claim 5 in which the flame retardant comprises a halogenated compound.

7. The process of claim 1 further comprising
    (iii) after step (ii), adding a crosslinking catalyst to the silane-functionalized polyolefin, the flame retardant and the PDMS.

8. The process of claim 1 in which the PDMS is present in an amount from 0.5 to 15 weight percent based on the combined weight of the silane-functionalized polyolefin, flame retardant and the PDMS.

9. A process for minimizing scorch of a silane-functionalized polyolefin (A) under melt mixing conditions, and (B) in the presence of a flame retardant, the process comprising the steps of:
  (i) contacting a first portion of the silane-functionalized polyolefin with the flame retardant;
  (ii) after step (i), adding a hydroxyl-terminated polydimethylsiloxane (PDMS) to the first portion of the silane-functionalized polyolefin and the flame retardant; and
  (iii) after step (ii), adding a second portion of the silane-functionalized polyolefin to the first portion of the silane-functionalized polyolefin, the flame retardant and the PDMS.

10. The process of claim 9 further comprising
  (iv) after step (iii), adding a crosslinking catalyst to the first portion of the silane-functionalized polyolefin, the second portion of the silane-functionalized polyolefin, the flame retardant and the PDMS.

11. The process of claim 7 comprising adding the crosslinking catalyst in an amount from at least 0.01 weight percent to less than 5 weight percent based on the combined weight of the silane-functionalized polyolefin and the crosslinking catalyst.

12. The process of claim 10 comprising adding the crosslinking catalyst in an amount from at least 0.01 weight percent to less than 5 weight percent based on the combined weight of the silane-functionalized polyolefin and the crosslinking catalyst.

13. The process of claim 1 comprising adding the PDMS in an amount from at least 0.5 weight percent to 7 weight percent based on the combined weight of the silane-functionalized polyolefin, the flame retardant and the PDMS.

14. The process of claim 9 comprising adding the PDMS in an amount from at least 0.5 weight percent to 7 weight percent based on the combined weight of the first portion of the silane-functionalized polyolefin, the second portion of the silane-functionalized polyolefin, the flame retardant and the PDMS.

* * * * *